No. 887,898. PATENTED MAY 19, 1908.
L. F. ADT.
NOSE GUARD FOR EYEGLASSES.
APPLICATION FILED MAR. 6, 1905.
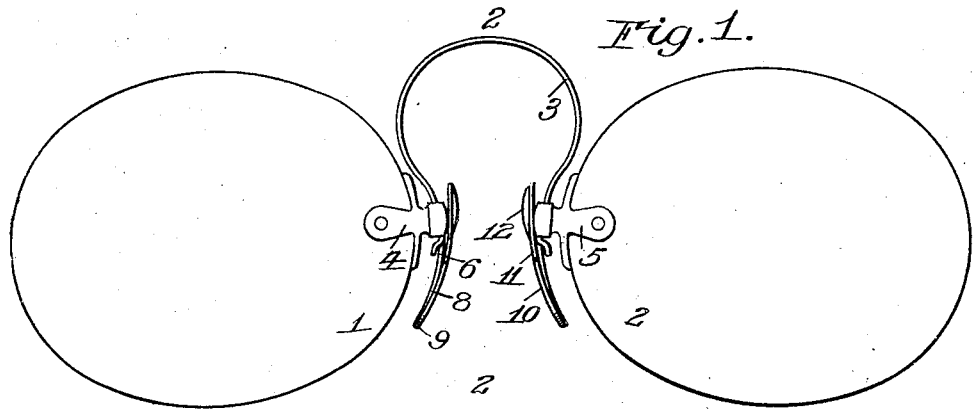
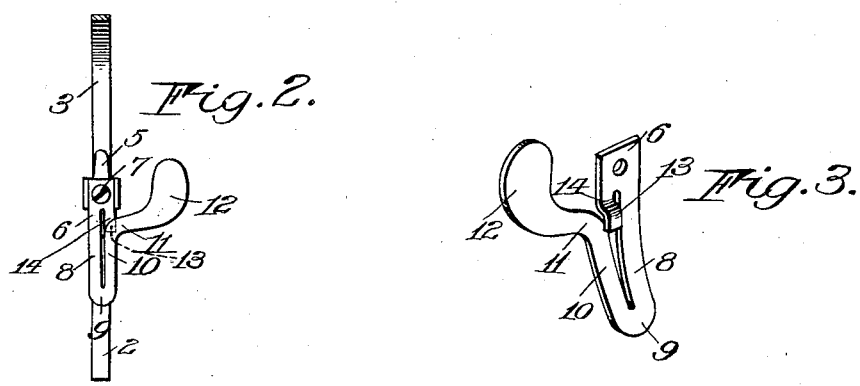
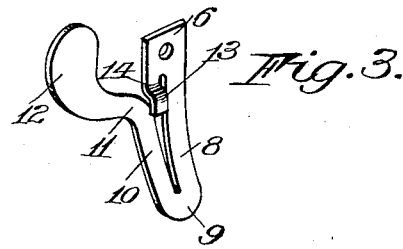
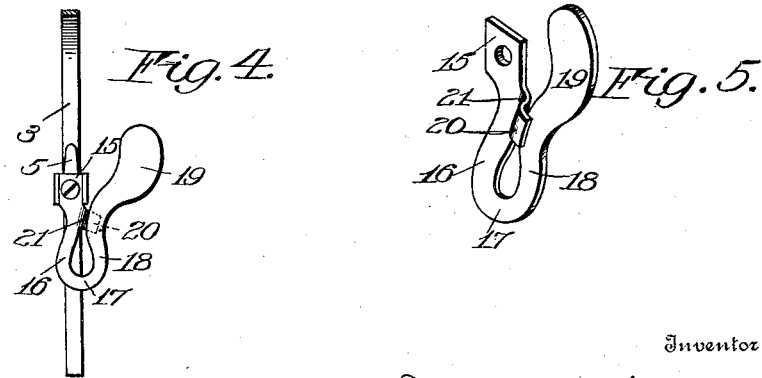
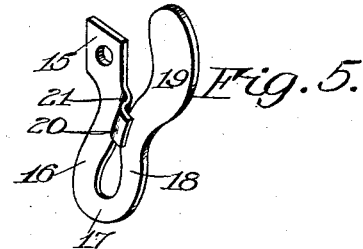

UNITED STATES PATENT OFFICE.

LEO F. ADT, OF TROY, NEW YORK.

NOSE-GUARD FOR EYEGLASSES.

No. 887,898.  Specification of Letters Patent.  Patented May 19, 1908.

Application filed March 6, 1905. Serial No. 248,428.

*To all whom it may concern:*

Be it known that I, LEO F. ADT, of Troy, in the county of Rensselaer and State of New York, have invented certain new and useful Improvements in Nose-Guards for Eyeglasses; and I do hereby declare the following to be a full, clear, and exact description of the same, reference being had to the accompanying drawings, forming a part of this specification, and to the reference-numerals marked thereon.

My present invention relates to improvements in nose guards for eyeglasses, and the purpose of my invention is to provide a guard which possesses ample resiliency to enable the eyeglasses to be firmly secured to the wearer's nose without unduly pinching it, and which is provided with means for limiting the degree of action of the guard which will allow the guard to properly seat itself but will prevent it from being moved far enough to strain or damage it.

To these and other ends my invention consists in certain improvements and combinations of parts all as will be hereinafter more fully explained the novel features being pointed out in the claims at the end of the specification.

In the drawings: Figure 1 is a rear elevation of a pair of eyeglasses to which a pair of guards embodying my improvements are applied; Fig. 2 is a transverse sectional view on the line 2—2 of Fig. 1. Fig 3 is a perspective view of the guard shown in Figs. 1 and 2 detached from the mounting. Fig. 4 is a view similar to Fig. 2 showing my improvements applied to a modified form of guard; and Fig. 5 is a perspective view of the guard shown in Fig. 4.

My present improvements are particularly applicable to nose guards of the form employing a yielding or resilient nose-engaging portion which is adapted to yield when the eyeglasses are applied to the wearer's nose to insure firmness and security of the guards thereon without undue pinching or pressure, such a guard being shown and described in Letters Patent No. 770,249 granted to me September 20th, 1904, and in Fig. 1 I have shown a complete pair of eyeglasses to which my improved guards are applied, 1 and 2 designating the respective lenses connected by the bridge 3, attaching devices 4 and 5 of any desired form being employed for the reception of the bridge and the nose guards. These nose guards may be formed in various ways and provided with my improvements accordingly, the guard shown in Figs. 1, 2 and 3 being preferably composed of flat resilient material embodying an apertured attaching portion 6 and adapted to enter the seat in one of the attaching devices and is secured therein by the usual screw 7, and to this attaching portion is connected the downwardly-extending shank 8, the latter being doubled edgewise of the material at 9 and extended upwardly to form the yielding arm 10.

The shank 8 and the arm 10 are preferably arranged substantially parallel for a portion of their length, the arm 10 extending directly beneath the attaching portion 6 of the guard, and then bending edgewise of the material at 11 to form the rearwardly-extending nose pad 12 which is preferably formed by expanding or enlarging the arm, and this pad 12 is adapted to coöperate with the wearer's nose supplementary to the loop formed by the shank 8 and the arm 10.  To the attaching portion 6 of the guard or to some other relatively fixed portion thereof is connected the stop 13 which in this particular form of guard extends downwardly therefrom substantially in alinement but extending behind the arm 10 on the outer side thereof, an offset 14 being preferably provided so that the stop will be located in such a position as to permit ample outward motion of the guard arm 10 carrying the pad 11. This stop 13 will engage the yielding arm 10 adjacent to the curved portion 11 thereof to limit the outward motion of the said arm and thereby prevent undue straining or breakage, the spring action of the guard normally causing the arm 10 thereof to normally occupy a position inwardly from the stop.

The guard shown in Figs. 4 and 5 embodies an attaching lug or portion 15 having the shank 16 extending downwardly therefrom and doubled rearwardly edgewise of the material at 17 to form the yielding upwardly-extending arm 18, the latter being provided with an enlarged nose-engaging pad 19 for coöperating with the wearer's nose supplementary to the surface formed by the flat sides of the shank 16, bend 17 and the lower portion of the arm 18. To the shank 16 preferably adjacent to the attaching lug 15 or to some other relatively fixed portion of the guard is attached a stop 20 which is adapted to coöperate with a portion of the arm 18 to limit the outward motion thereof, an offset 21 being preferably provided to enable the sides of the shank 16 and arm 18 to lie in substantially the same plane to enable them both to contact with the wearer's nose and to arrest the motion of the yielding arm 18 when it has moved outwardly beyond a predetermined limit.

My invention is capable of being applied to guards of various forms wherein there is employed a yielding arm for engaging the wearer's nose, and a limiting stop of the kind described may be applied to the guards in such a way that the parts thereof may occupy their proper relative positions, and which will only operate when the yielding parts of the guards are unduly bent or strained and are liable to be distorted or broken.

I claim as my invention:

1. A noseguard for eyeglasses composed of flat material embodying a shank, a yielding arm arranged edgewise thereto and carrying a nose-engaging pad, and a stop for limiting the motion of the yielding arm in a plane transverse to the nose-engaging surface of the pad.

2. A noseguard for eyeglasses composed of flat material embodying a shank having an attaching portion, a yielding arm arranged edgewise in rear of the shank and carrying a nose-engaging pad, and a stop arranged to coöperate with the said arm for limiting the motion thereof.

3. A noseguard for eyeglasses embodying a shank doubled to form a yielding arm provided with a nose-engaging portion, the sides of the shank and the arm lying in substantially the same plane, and a stop arranged to coöperate with the said arm for limiting the motion thereof.

4. A noseguard for eyeglasses embodying a shank having an attaching portion formed thereon, a yielding nose-engaging arm extending into proximity to the shank, and a rearwardly extending stop formed on the shank and arranged behind the yielding arm for limiting the outward motion thereof.

5. A noseguard for eyeglasses embodying a shank adapted for attachment to the lenses, a yielding nose-engaging arm extending into proximity to the shank, and an outwardly offset stop on the shank extending rearwardly behind the yielding arm for limiting the motion of the latter.

6. A noseguard for eyeglasses embodying a shank doubled to form a yielding nose-engaging pad, the sides of the shank and arm being adapted to lie in substantially the same plane and form nose-engaging surfaces, and a stop arranged between the shank and arm to limit the relative motion thereof and having an offset to permit the nose-engaging portions of the shank and arm to occupy substantially the same plane.

7. A nose guard for eyeglasses composed of flat material embodying an attaching shank, a yielding arm carrying a nose-engaging pad, and a projection extending edgewise of the shank and arranged to engage the yielding arm to limit the relative motion between the latter and the shank in a direction transverse of the nose-engaging surface of the pad.

8. In eyeglasses, the combination with the lenses, the bridge connecting them, and the attaching devices for the spring and guards, of noseguards each embodying a downwardly-extending shank doubled to form an upwardly-extending yielding arm carrying a nose-engaging pad and a stop offset outwardly and arranged in the path of the said arm to limit the outward motion thereof.

9. In eyeglasses, the combination with the lenses, the bridge connecting them, and the attaching devices for the spring and guards, of noseguards each embodying a downwardly-extending shank doubled and extended upwardly to form a yielding arm, the sides of the shank and arm being adapted to form nose-engaging portions, a supplemental nose-engaging portion formed on the yielding arm, and a stop offset outwardly and arranged to coöperate with the said arm to limit its outward motion.

10. In eyeglasses, the combination with the lenses, the bridge connecting them, and the attaching devices for the spring and guards, of nose guards composed of flat material embodying the downwardly-extending shank doubled rearwardly edgewise of the material and form an upwardly-extending yielding arm provided at its end with a nose-engaging pad, the flat sides of the shank and arm being adapted to occupy substantially the same plane and forming nose-engaging surfaces, and a stop embodying a projection extending rearwardly edgewise of the shank and offset outwardly from the latter to engage the said arm to limit its outward motion.

11. A nose guard embodying a shank, an upwardly and rearwardly extending arm carrying a nose bearing pad and a stop arranged in the rear of the shank and in the path of the upwardly and rearwardly extending arm.

12. A nose guard for eyeglasses embodying an attaching portion, an upwardly and rearwardly extending arm connected to the guard below the attaching portion and carrying a nose bearing pad, and a stop for limiting the outward movement of the nose bearing pad, extending rearwardly from the attaching portion.

13. A nose guard embodying an attaching portion, an upwardly extending arm carrying a nose engaging pad arranged in rear of the attaching portion, and a stop extending rearwardly from the attaching portion to limit the outward movement of the pad.

LEO F. ADT.

Witnesses:
F. F. CHURCH,
G. WILLARD RICH.